United States Patent [19]

Shinjo

[11] Patent Number: 5,548,996
[45] Date of Patent: Aug. 27, 1996

[54] SENSOR FOR AUTOMOBILE

[75] Inventor: Izuru Shinjo, Himeji, Japan

[73] Assignee: Mitsubishi Denki Kabushiki Kaisha, Tokyo, Japan

[21] Appl. No.: 297,287

[22] Filed: Aug. 29, 1994

[30] Foreign Application Priority Data

Aug. 31, 1993 [JP] Japan .................... 5-216215

[51] Int. Cl.⁶ ................................ G01M 15/00
[52] U.S. Cl. ........................ 73/116; 427/388.1
[58] Field of Search .................. 73/116, 117.3; 427/59, 388.1

[56] References Cited

U.S. PATENT DOCUMENTS

| | | | |
|---|---|---|---|
| 3,650,809 | 3/1972 | Gilliam et al. | 427/388.1 |
| 4,107,355 | 8/1978 | Merchant et al. | 427/388.1 |
| 4,694,688 | 9/1987 | Takahashi et al. | 73/116 |
| 4,718,396 | 1/1988 | Shimada et al. | 73/117.3 |
| 4,821,560 | 4/1989 | Kohlbauer | 73/117.3 |
| 4,876,116 | 10/1989 | Mehan et al. | 427/388.1 |
| 4,965,102 | 10/1990 | Inai et al. | 427/388.1 |
| 5,056,360 | 10/1991 | Dosdall et al. | 73/116 |
| 5,079,945 | 1/1992 | Hansen et al. | 73/116 |
| 5,117,681 | 6/1992 | Dosdall et al. | 73/116 |
| 5,119,670 | 6/1992 | Whitehorn et al. | 73/116 |
| 5,154,954 | 10/1992 | Croop et al. | 427/388.1 |
| 5,361,630 | 11/1994 | Kowalski | 73/117.3 |
| 5,383,350 | 1/1995 | Bennett et al. | 73/117.3 |

Primary Examiner—Richard Chilcot
Assistant Examiner—Eric S. McCall
Attorney, Agent, or Firm—Sughrue, Mion, Zinn, Macpeak & Seas

[57] ABSTRACT

A sensor for an automobile wherein a coating material 35 for covering the connections between a sensor body 11 and lead wires 20 is formed by injection-molding a thermoplastic elastomer. Since the elastomer has rubber elasticity, no stress concentration takes place in the lead wire connections even though the sensor is vibrated, and disconnection of the lead wires cannot easily take place.

8 Claims, 2 Drawing Sheets

SENSOR FOR AUTOMOBILE

BACKGROUND OF THE INVENTION

1. Field of the Invention

This invention relates to a sensor for an automobile, and more particularly to a sensor for an automobile of a type having a connection portion between a sensor body and a lead wire, the connection portion being covered with a coating material.

2. Description of the Related Art

FIG. 4 is a cross sectional view which illustrates a conventional crank angle sensor for an automobile. A crank angle sensor 1 comprises a sensor body 10, lead wires 20 for establishing the connection between the sensor body 10 and an external unit, and a connection portion between the sensor body 10 and the lead wires 20.

Initially, the sensor body 10 will now be described. Referring to FIG. 4, a body 11 is manufactured by molding resin. An L-shaped first guide 12 made of a magnetic material is attached to an end of the body 11. A magnet 13 is attached to the first guide 12. An L-shaped second guide 14 is attached to the body 11 in such a manner that the second guide 14 faces the first guide 12. Furthermore, a hole IC 15 is attached to the body 11 in such a manner that the hole IC 15 faces the magnet 13. For example, three insert terminals 16 serving as lead portions are embedded in the body 11 by insert molding. End portions of the insert terminals 16 are electrically connected to the hole IC 15, while other end portions of the same are formed into an external connection portion 16a outwardly projecting over the body 11.

Note that the second guide 14 and so forth are covered with a cover 17. A detection space 18 is formed between the first guide 12 and the magnet 13 and between the second guide 14 and the hole IC 15.

The lead wires 20 and the connection portion between the sensor body 10 and the lead wires will now be described. Referring to FIG. 4, each of the lead wires 20 has a core wire portion 20a, the outer surface of which is covered with a coating portion 20b. A rubber case 21 serving as the covering portion is opened in the upper portion thereof and at a portion thereof adjacent to the body 11, the rubber case 21 covering the lower portion of the external connection portion 16a of each of the insert terminals 16. The rubber case 21 is filled with a thermosetting filler 22 serving as a coating material so as to cover the upper portion of the external connection portion 16a of each of the insert terminals 16.

In the foregoing case, each of the lead wires 20 is inserted into the rubber case 21 through an end thereafor. The core wire portion 20a appearing in the leading portion of the lead wire 20 is caulked by a caulking portion 16b formed at an end of the external connection portion 16a of each of the insert terminals 16 so that the core wire portion 20a is held and then connected by soldering.

Then, the operation of the crank angle sensor 1 will now be described with reference to FIG. 5. A disc-like vane 2 made of a magnetic material is attached to an end of a crank shaft (not shown). The vane 2 has three projections 2a formed at, for example, the same pitch on the outer surface thereof. As shown in FIG. 4, the projections 2a of the vane 2, while rotating, move in the detection space 18 in the crank angle sensor 1 when the crank shaft is rotated.

In a case where the projections 2a of the vane 2 are not present in the detection space 18, a magnetic flux emitted from the magnet 13 forms a magnetic circuit passing through the first guide 12, the second guide 14 and the hole IC 15 and then returning to the magnet 13. In the foregoing case, the hole IC 15 detects the magnetic flux and transmits an ON signal. If the projections 2a of the vane 2 are present in the detection space 18, the magnetic flux emitted from the magnet 13 forms a magnetic circuit passing through the first guide 12 and the projections 2a of the vane 2 and then returning to the magnet 13. Since the magnetic flux of the magnet 13 does not reach the hole IC 15 in the foregoing case, the hole IC 15 does not detect the magnetic flux and transmits an OFF signal. Therefore, the crank angle sensor 1 detects the rotational angle of the crank shaft depending upon whether or not the hole IC 15 detects the magnetic flux.

The crank angle sensor 1 is disposed in the engine portion of an automobile in which corrosive gas and/or corrosive liquid is present and which is vibrated violently. Therefore, in the connection portion between the sensor body 10 and the lead wire 20, the connection between the insert terminals 16 and the lead wire 20 and the like must be satisfactorily sealed against gas and/or liquid, and disconnection of the lead wire 20 occurring due to vibrations must be prevented.

Therefore, the end of the rubber case 21 is attached to the body 11 of the sensor body 10 in such a manner that it elastically and hermetically comes in contact with the body 11. Thus, no gap is formed between the rubber case 21 and the body 11. The thermosetting filler 22 to be enclosed in the rubber case 21 is made of a material exhibiting sufficient bonding characteristics with respect to the rubber case 21 so that no gap is formed between the rubber case 21 and the thermosetting filler 22. Since the end of the lead wire 20 is supported by the rubber case 21 that can easily elastically be deformed, no stress concentration takes place in the area at which the lead wire 20 is inserted into the rubber case 21, or the like. Therefore, no disconnection takes place in the lead wire 20.

However, the foregoing crank angle sensor 1 must have a large number of elements in the connection portion between the sensor body 10 and the lead wire 20 thereof. Therefore, there arises a problem in that an excessively large number of manufacturing processes are required and accordingly the manufacturing cost cannot be reduced. What is worse, a long time is required to mount the rubber case 21 on the body 11, thus causing the cost to be raised. In a case where the thermosetting filler 22 in the rubber case 21 is hardened by injecting the foregoing elements in a hot bath set to a predetermined temperature level, the liquid thermosetting filler 22 flows over the rubber case 21. As a result, there arises a problem of an unsatisfactory manufacturing yield.

SUMMARY OF THE INVENTION

Accordingly, the present invention has been found to overcome the foregoing problems, and an object of the same is to provide a sensor for an automobile which can easily and assuredly be manufactured with a low cost and which exhibits lead wires that cannot easily be disconnected.

According to one aspect of the present invention, there is provided a sensor for an automobile comprising: a detection device; a sensor body accommodating the detection device; lead wires projecting over the sensor body; a lead portion electrically connected to the lead wires and embedded in the sensor body; and a coating material disposed in the sensor body in such a manner that the coating material covers a portion for establishing the connection among the lead wires and the lead portion, the coating material being made of an elastomer molded by injection molding.

DESCRIPTION OF THE PREFERRED EMBODIMENT

Figure 1:
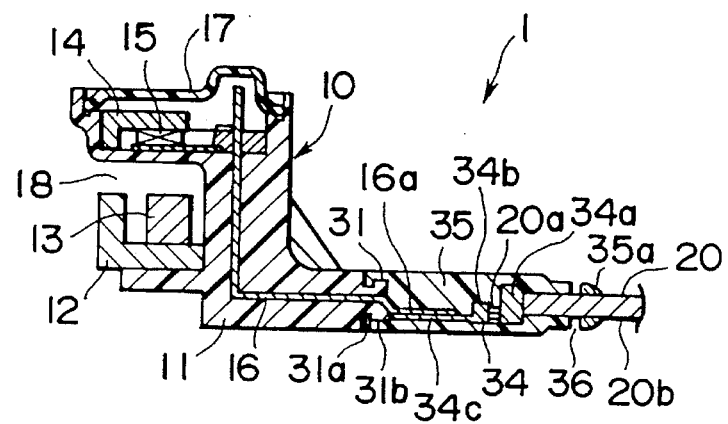
FIG. 1 is a cross sectional view which illustrates a crank angle sensor according to an embodiment of the present invention.
Figure 2:
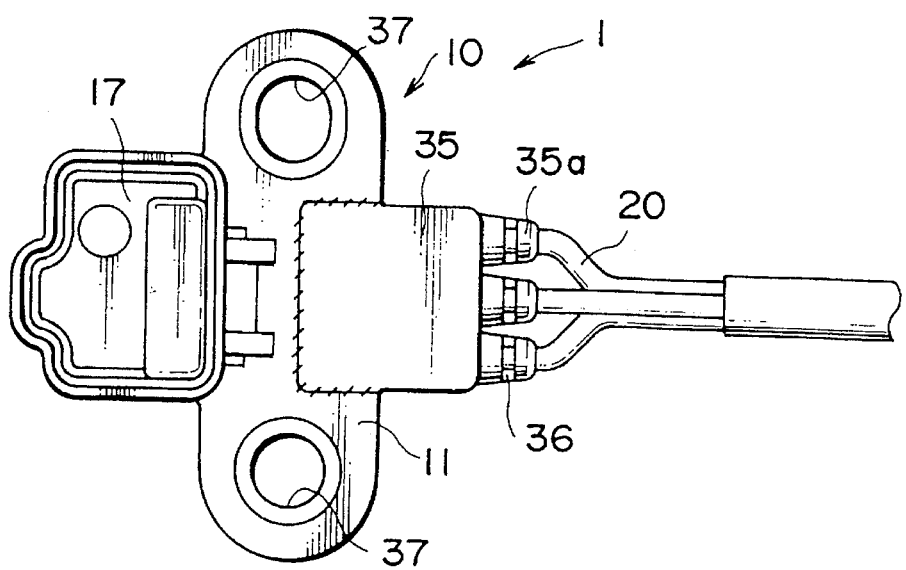
FIG. 2 is a plan view which illustrates the crank angle sensor shown in FIG. 1.
Figure 3:
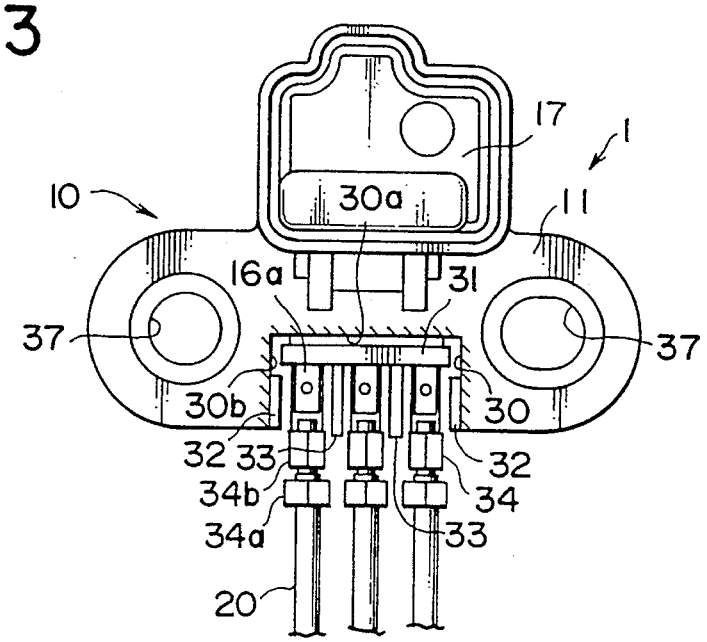
FIG. 3 is a plan view which illustrates the crank angle sensor shown in FIG. 1 in a state where it has not been covered with a coating material.
Figure 4:
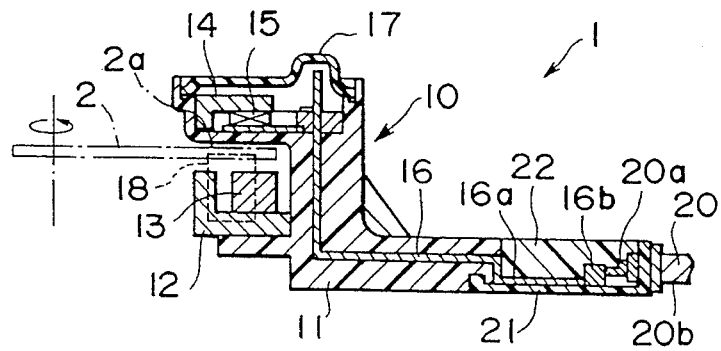
FIG. 4 is a cross sectional view which illustrates an example of a conventional crank angle sensor.
Figure 5:
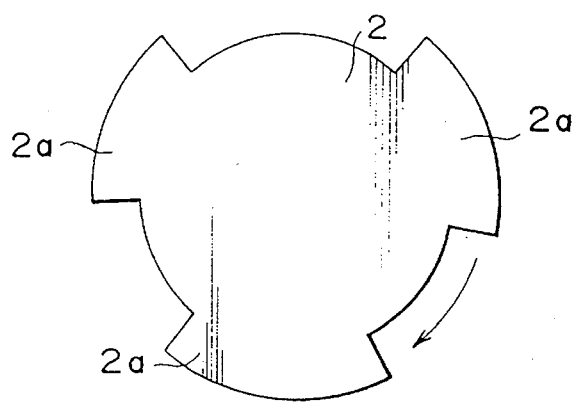
FIG. 5 is a plan view which illustrates a vane passing through a detection space for the crank angle sensor.

An embodiment of the present invention will now be described with reference to FIGS. 1–3 of the drawings, wherein the same elements as those of the crank angle sensor shown in FIG. 4 are given the same reference numerals and omitted from the description. The description below is made about the connection portion between the sensor body 10 and the lead wires 20. The original function of the crank angle sensor 1 is omitted from the description.

Referring to the drawings, a recess groove or cut-out 30 is formed in the body 11 for the purpose of establishing the connection between the sensor body 10 and the lead wire 20. A projecting portion 31 is, as a portion of the body 11, formed on the bottom surface 30a of the recess groove 30 over which the insert terminals 16 project. The projection portion 31 comprises at least one pair of labyrinth-like projection/recess gripping portions or lips 31a and 31b formed to run parallel to the bottom surface 30a of the recess groove 30. Thus, the insert terminals 16 pass through the projection portion 31 and project over the recess groove 30. Convex anchor portions 32 are, as portions of the body 11, formed on side surfaces 30b of the recess groove 30. Partition portions 33 for separating the insert terminals 16 from one another are formed between the insert terminals 16, the partition portions being formed to project beyond the projection portion 31. Terminals 34 for establishing the connection with the insert terminals 16 are attached to the leading portions of the lead wires 20.

Each of the terminals 34 comprises a first caulking portion 34a for caulking and holding the lead wire 20 from outside of the coating portion 20b, a second caulking portion 34b that caulks a flat portion of the core wire portion 20a of the lead wire 20 and is connected electrically with the lead wire 20, and a connection portion 34c stacked on the external connection portion 16a of the insert terminal 16 and joined together with the insert terminal 16 by welding. The terminal 34 is previously attached to the lead wire 20 through the first and second caulking portions 34a and 34b.

A coating material 35 covers the connection portion between the sensor body 10 and the lead wires 20 to seal the connection portion, the coating material 35 also preventing disconnection of each of the lead wires 20. The coating material 35 is made of a thermoplastic-type elastomer (a polymer substance having rubber elasticity at room temperature) obtained by injection molding. The recess groove 30 of the body 11 is filled with the coating material 35. Furthermore, the coating material 35 covers the outer portions of the lead wires 20 adjacent to the recess groove 30. Note that the end of the coating material 35 is formed into small coating portions 35a respectively covering the lead wires 20. Each of the small coating portions 35a of the coating material 35 has a groove portion 36, while the body 11 has holes 37 for mounting the crank angle sensor 1.

A method of manufacturing the connection portion between the sensor body 10 and the lead wires 20 will now be described. The connection portions 34c of the terminals 34 attached to the lead wires 20 and the external connection portions 16a of the insert terminals 16 of the sensor body 10 are stacked up and joined together by welding. Then, the portion in the vicinity of the recess groove 30 of the body 11 of the sensor body 10 is heated to improve the adhesive property between the body 11 and the coating material 35. That is, the portion in the vicinity of the recess groove 30 of the body 11 is heated so that the surface of the body 11 is roughened and the surface area is widened so that the coating material 35 and the body 11 are easily bonded to each other. Furthermore, the heat energy of the heating process activates material molecules and partially decomposes and makes stable the established bond. Because of the foregoing factor, the adhesive property between the coating material 35 and the body 11 can be improved.

Then, the sensor body 10, to which the lead wires 20 are connected through the terminals 34, is set in a mold to perform injection molding for the purpose of covering the connection portion between the sensor body 10 and the lead wires 20 with the coating material 35. In the foregoing case, the presence of the projection portion 31, the anchor portions 32 and the partition portions 33 on the inside of the recess groove 30 of the body 11 enables the area of contact between the coating material 35 and the body 11 to be maintained sufficiently. Thus, the coating material 35 can be reliably secured to the body 11. By covering the connection portion between the sensor body 10 and the lead wires 20 with the coating material 35, the connection portion between the sensor body 10 and the lead wires 20 can be formed completely and thus manufacturing of the crank angle sensor 1 can be completed.

Since the crank angle sensor 1 has the arrangement that the connection portion between the sensor body 10 and the lead wires 20 is covered with the coating material 35 solely made of the elastomer so that the connection portion is sealed up as described above, the number of elements can be decreased and the cost of the elements can be reduced. Since the coating material 35 can be formed by injection molding, it can easily be manufactured and thus the manufacturing cost can be reduced also from this viewpoint. It should be noted that injection molding does not require a complicated work of expanding the rubber case 21 that has been required in the conventional technology.

Since the coating material 35 is made of the elastomer having rubber elasticity, if vibrations are transmitted to the crank angle sensor 1, also the coating material 35 is deflected simultaneously with the vibrations of the lead wires 20. Therefore, no stress concentration takes place in the lead wires 20 and thus disconnection of the lead wires 20 can be prevented. Since the small coating portion 35a is formed at each of the side portions of the lead wires 20 of the coating material 35 and each small coating portion 35a has the groove portion 36, the lead wires 20 can easily be deformed thanks to the small coating portions 35a and the groove portions 36. Therefore, disconnection of the portion, in which the lead wires 20 are attached to the coating material 35, can satisfactorily be prevented.

Sine the projection portion 31 in the body 11 for holding the insert terminals 16 of the foregoing crank angle sensor 1 has the labyrinth-like projection/recess portions or lips 31a and 31b that run parallel to the bottom surface 30a of the recess groove 30, the interface distance between the body 11 and the coating material 35 for which external gas or the like reaches the insert terminals 16 can be lengthened. As a result, the crank angle sensor 1 is enabled to have an improved sealing characteristic against gas and liquid. In addition, the partition portions 33 of the body 11 disposed among the insert terminals 16 are able to mutually shield the insert terminals 16. Therefore, the partition portions 33 effectively prevent short-circuiting between adjacent insert terminals 16 and the terminals 34.

Since the sensor body 10 and the lead wires 20 are connected to one another in such a manner that the terminals 34 previously attached to the lead wires 20 are, by welding, attached to the insert terminals 16 of the sensor body 10, the operation for connecting the sensor body 10 and the lead wires 20 can easily be performed.

If the foregoing embodiment is arranged in such a manner that the body 11 is made of PBT (polybutylene terephthalate) resin or PET (polyethylene terephthalate) resin and the coating material 35 is made of a polyester-type elastomer exhibiting excellent adhesive property with the PBT resin and the PET resin, the adhesive property between the body 11 and the coating material 35 can further be improved. Thus, the sealing performance realized by the coating material 35 can further be improved.

Although in the foregoing embodiment the coating material 35 is made of the elastomer, it may be made of vulcanized rubber manufactured by injection molding. Note that this case requires a vulcanizing process to be performed after the molding process.

Although the foregoing embodiment has been described in reference to the crank angle sensor 1, a similar effect can be obtained in a case where the present invention is applied to a knock sensor for an automobile or the like that is attached to a portion in which corrosive gas and/or corrosive liquid is present and which is vibrated frequently (for example, the engine portion of an automobile) if a similar connection portion is employed to establish the connection between the sensor body 10 and the lead wires 20.

What is claimed is:

1. A sensor for an automobile engine, comprising:
   a) a detection device (12–15),
   b) a sensor body (10–11) accommodating the detection device,
   c) a recess (30) defined in an edge of the sensor body remote from the detection device,
   d) a plurality of signal wires (16) embedded in the sensor body, each having one end connected to the detection device and another, opposite end (16a) extending into the recess,
   e) an equal plurality of lead wires (20) each having an end terminal (34) extending into the recess and electrically connected to an associated signal wire opposite end, and
   f) an injection molded elastomer material (35) completely filling the recess and sealingly enclosing and encapsulating said opposite ends of the signal wires, said end terminals of the lead wires and said electrical connections therebetween.

2. A sensor according to claim 1, wherein said elastomer material is a thermoplastic polyester elastomer, and said sensor body in contact with said elastomer material, is made of resin selected from the group consisting of polybutylene terephthalate and polyethylene terephthalate.

3. A sensor according to claim 1, wherein said electrical connections are established by welding.

4. A sensor according to claim 1, further comprising an elastomer material gripping member (31) integral with the sensor body, projecting into the recess, and parallel to a rear edge (30a) thereof, said gripping member having upper and lower lips (31a, 31b) enclosed by the elastomer material, and the signal wires extending into the recess through the gripping member.

5. A sensor according to claim 4, further comprising partition means (33) integral with the sensor body and extending into the recess between adjacent signal wire opposite ends.

6. A sensor according to claim 5, further comprising anchor projections (32) integral with the sensor body and individually extending into the recess from opposite side edges thereof.

7. A sensor according to claim 6, further comprising grooves (36) individually defined in the elastomer material proximate the end terminals of the lead wires to accommodate bending of the lead wires.

8. A sensor according to claim 4, wherein the opposite ends of the signal wires and the end terminals of the lead wires are flat strips, and associated pairs of said strips overlie one another to form said electrical connections.

* * * * *